Nov. 1, 1960 E. L. STERNER 2,958,499
WASTE RECEPTACLE FOR VEHICLES
Filed Sept. 11, 1957 2 Sheets-Sheet 1
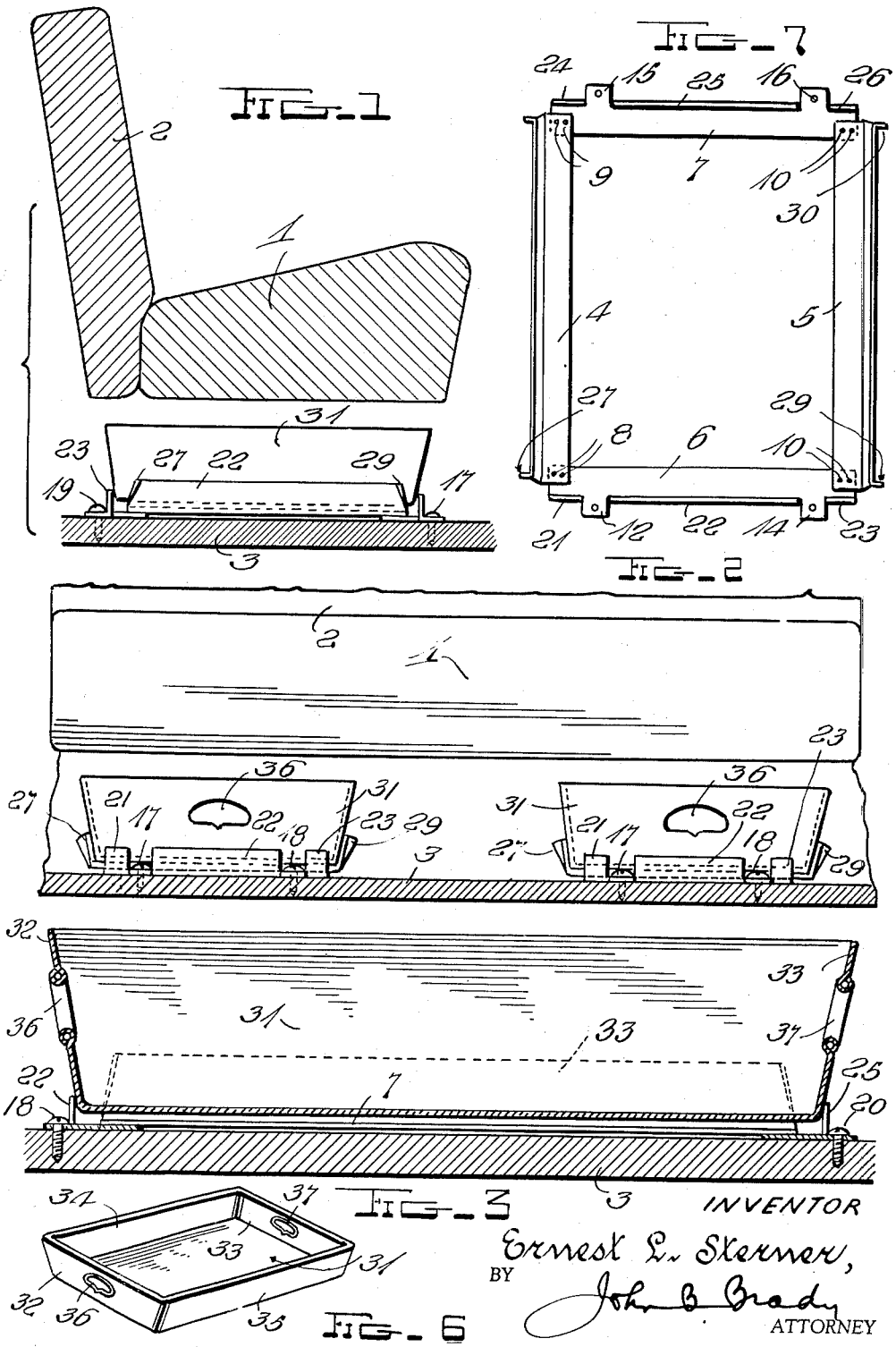
INVENTOR
Ernest L. Sterner,
BY John B. Brady
ATTORNEY

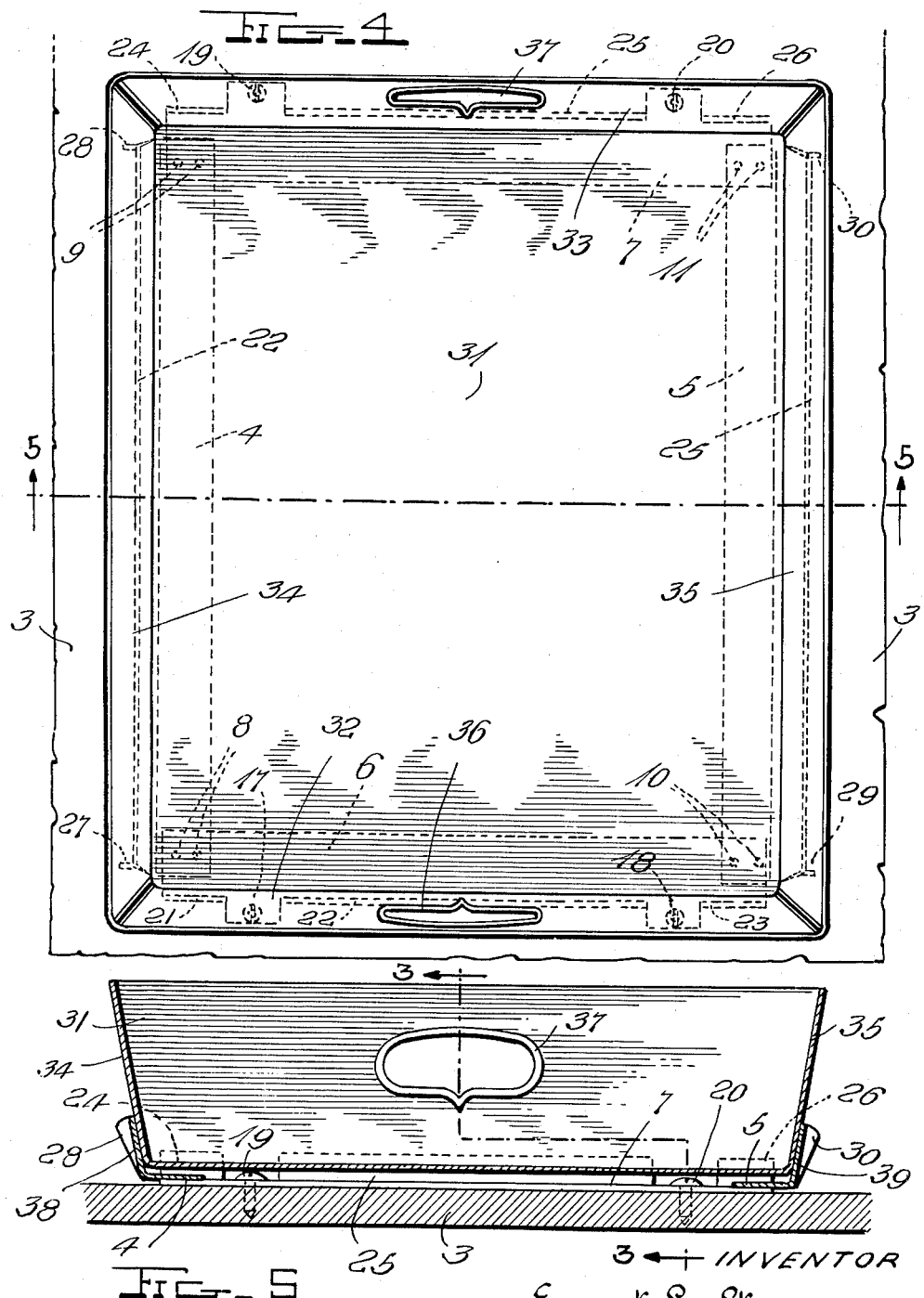

United States Patent Office 2,958,499
Patented Nov. 1, 1960

2,958,499
WASTE RECEPTACLE FOR VEHICLES
Ernest L. Sterner, W. Broadway Extended, Red Lion, Pa.
Filed Sept. 11, 1957, Ser. No. 683,307
2 Claims. (Cl. 248—346)

My invention relates broadly to vehicles and more particularly to a receptacle for waste for convenient installation upon vehicles.

One of the objects of my invention is to provide a construction of track and coacting receptacle which may be readily installed as an assembly beneath the front seat of an automobile and the receptacle withdrawn from beneath the seat in guides formed by the track for receiving waste material, and restored to position beneath the seat until there is opportunity for removing and dumping the contents of the receptacle.

Another object of my invention is to provide a construction of waste receptacle particularly adapted for installation upon vehicles and which may be readily pressed from sheet metal and arranged for coaction with a guide track attachable to the vehicle.

Still another object of my invention is to provide an arrangement of resilient track and tray assembly for installation beneath the front seat of an automobile in which the track and tray are shaped to permit the insertion and removal of the tray with respect to the area beneath the front seat of the automobile.

A further object of my invention is to provide a track and tray assembly for installation below the front seat of an automobile in which the track is pre-punched to serve as a template for the insertion of self-tapping screws adapted to be driven into the floor of the vehicle for fixing the track in position to receive, guide, and grip the tray with respect to the area beneath the front seat of the automobile.

Other and further objects of my invention is to provide a track and tray assembly for installation below the front seat of an automobile in which the track is provided with limit stops for restricting the movement of the tray beneath the front seat of the automobile and wherein the track is provided with resilient guides for gripping and guiding the sides of the tray as set forth more fully in the specification hereinafter following by refernce to the accompanying drawings in which:

Fig. 1 is a side elevational view of the track and tray assembly of my invention installed beneath the front seat of an automobile;

Fig. 2 is a front view showing one manner of mounting the track and tray assembly with respect to the front seat of an automobile;

Fig. 3 is a vertical sectional view taken substantially on line 3—3 of Fig. 5 and illustrating the manner in which the tray is gripped within the track;

Fig. 4 is a plan view of the track and tray assembly illustrated on a larger scale;

Fig. 5 is a transverse sectional view taken on line 5—5 of Fig. 4.

Fig. 6 is a perspective view of the waste receptacle; and

Fig. 7 is a top plan view of the track which is installed on the floor of the vehicle beneath the front seat for removably receiving the waste receptacle.

My invention is directed to a track and tray assembly which may be conveniently installed in the small amount of space normally available between the floor of a vehicle and the bottom of the front seat of the vehicle. I provide a construction of track formed from metal and provided with apertures therein enabling the track to serve as a template for mounting the track in position on the floor of the vehicle in the area available beneath the front seat of the automobile by use of self-tapping screws which may be inserted into the apertures and sharply struck with a hammer for driving the self-tapping screws into the floor and thereafter fastened into the floor with the aid of a screwdriver. The track is die-pressed from metal and spot-welded and is provided with limit stops for properly positioning the coacting tray. The track is also formed with upwardly extending tapered sides which serve to resiliently receive and grip the tray in position with respect to the track. The tray may be produced from metal, plastic, paper, or other substance and has tapered sides and ends which coact with the tapered sides of the track and with the limit stops on the ends of the track for maintaining the tray inp osition beneath the front seat of the automobile. Handles are provided on one or both ends of the tray whereby the tray is accessible from either front or rear seat of the automobile for moving the tray either forwardly or rearwardly to receive debris or waste. The tray is readily removable for cleaning and can be used as a conventional tray on picnics, outings, etc. The fact that the tapered sides of the track are resilient enable the track to hug the tapered sides of the tray for preventing chattering of the tray under the normal vibration of driving. The fact that the track is provided with tapered sides and that the tray is also formed with tapered sides facilitates stacking, shipping and storage of both of these items in mass production.

Referring to the drawings in more detail reference character 1 schematicly indicates the front seat of an automobile with a coacting back 2 slightly spaced above the floor 3 of the automobile. In this space which is normally unoccupied I provide the track and tray assembly of my invention. The track consists of a metallic frame formed by longitudinally extending side members 4 and 5 interconnected at opposite ends by transverse members 6 and 7 which are spot-welded at 8 and 9 to the side member 4 and spot-welded at 10 and 11 to side member 5. The end members 6 and 7 are each provided with symmetrically arranged sets of lugs shown at 12, 14, 15 and 16. These lugs are pre-punched providing apertures which serve as means for centering the track with respect to the floor of the automobile and enable self-tapping screws to be inserted therethrough and driven with a hammer to starting position after which the screws may be driven into the floor 3 by a screwdriver providing anchoring means for the track as represented at 17, 18, 19 and 20. The end means 6 and 7 also include upperwardly directed limit stops for opposite ends of the tray formed by flanges 21, 22, 23 and 24, 25 and 26. That is the two end flanges are interrupted by the outwardly struck lugs but serve as limit stops throughout the entire transverse dimension of the tray.

The side members 4 and 5 are tapered upwardly and outwardly and are both resilient or yieldable. These side members 4 and 5 at their opposite ends are provided with outwardly directed flange portions 27, 28, 29 and 30 which form reinforcing ribs for the upwardly and outwardly extending lineal sides of the side members 4 and 5 and also means for centering and guiding the tray into position with respect to the track.

The tray formed from metal, plastic, paper, or any similar substance is shown at 31 having tapered ends 32 and 33 and tapered sides 34 and 35. When the tray is formed from metal it may be die-pressed and the ends welded. When the tray is formed from plastic, the tray is moulded in a single piece. The tapered ends 32 and 33 may be provided with handles 36 and 37 to provide means for gripping the tray either from the front of the front seat or from the back of the front seat so that the tray may be withdrawn from beneath the front seat forwardly to receive debris or waste or the tray may be withdrawn rearwardly from the front seat to receive debris or waste deposited by occupants of the rear seat of the automobile. The tapered sides 34 and 35 of the tray coact with the tapered sides 38 and 39 of the side members 4 and 5, the tray being snugly gripped between the upwardly extending portions 38 and 39 of the side members 4 and 5 while the tray is maintained in position between the limit stops 21, 22, 23 and 24, 25, 26. The outwardly directed flange portions 27, 28, 29, and 30 preclude any permanent distortion of the outwardly directed tapered sides 38 and 39 and insure the restoration of the yieldable side portions 38 and 39 to their original positions gripping the upwardly and outwardly tapered sides 34 and 35 of the tray. These flares at 27 and 29 at the front of the track and at 28 and 30 at the rear of the track facilitate the centering of the tray when the tray is being inserted into the track from either the front or rear of the front seat.

Accumulations of debris and waste deposited in the tray 31 may be discharged or dumped from the tray when the tray is withdrawn from the track and taken out of the automobile. The empty tray may then be readily inserted into the track for receiving further debris and waste and prevent such debris and waste from being scattered onto the highway. In many States there are ordinances regulating the scattering of debris and waste on highways and the receptacle of my invention has proven highly effective in meeting all of the requirements of such regulations.

Fig. 2 illustrates one manner of mounting the track and tray assembly beneath the front seat of an automobile. The view is intended to indicate that the waste receptacle may be installed under both the driver's and the passenger's side of the front seat or the waste receptacle may be installed under only one side of the front seat. The waste receptacle is particularly convenient and effective when installed under the passenger's side of the front seat.

While I have described my invention in certain of its preferred embodiments I realize that modifications may be made and I desire that it be understood that no limitations upon my invention are intended other than may be imposed by the scope of the appended claims.

What I claim as new and desire to secure by Letters Patent of the United States is as follows:

1. A guide and holding means for a receptacle comprising a substantially rectangular open frame having flat longitudinally extending side portions interconnected by flat transversely extending end portions, said longitudinally extending flat side portions having upwardly and outwardly directed marginal portions forming substantially obtuse angles with respect to said flat longitudinally extending side portions, said flat transversely extending end portions having vertically disposed peripheral portions, said peripheral portions being interrupted at spaced intervals, flat lugs projecting from said flat transversely extending end portions through the interruptions in said vertically extending peripheral portions and forming fastening means for said frame, said longitudinally disposed upwardly and outwardly directed marginal portions constituting a guide track for a receptacle having tapered sides adapted to coact with the upwardly and outwardly directed marginal portions of said frame and said vertically disposed marginal portions constituting end abutments for restricting the movement of the receptacle within said upwardly and outwardly directed marginal portions of said side portions.

2. A guide and holding means for a receptacle as set forth in claim 1 in which each of said upwardly and outwardly directed marginal portions are provided with externally disposed tapered ribs adjacent each end thereof, said ribs having their maximum width adjacent the terminus of said upwardly and outwardly directed marginal portions and their minimum width adjacent the junction of said flat longitudinally extending side portions with the upwardly and outwardly directed marginal portions for reinforcing said upwardly and outwardly directed marginal portions and guiding the receptacle into position between the interior faces of said upwardly and outwardly directed marginal portions.

References Cited in the file of this patent

UNITED STATES PATENTS

| | | |
|---|---|---|
| 601,744 | Wells et al. | Apr. 5, 1898 |
| 1,239,881 | Cawby | Sept. 11, 1917 |
| 1,544,018 | McDonald | June 30, 1925 |
| 1,624,766 | Schroder | Apr. 12, 1927 |
| 2,441,752 | Campbell | May 18, 1948 |
| 2,798,230 | Le Febvre et al. | July 9, 1957 |

FOREIGN PATENTS

| | | |
|---|---|---|
| 648,322 | Great Britain | Jan. 3, 1951 |